United States Patent [19]

Schneider et al.

[11] Patent Number: 5,582,280

[45] Date of Patent: Dec. 10, 1996

[54] MOTOR VEHICLE MANUAL TRANSMISSION WITH A CLUTCH WHICH CLUTCH HAS A FASTENING STRUCTURE FOR FASTENING THE LINING SPRING SEGMENTS TO THE DRIVING PLATE

[75] Inventors: Jens Schneider; Harald Jeppe, both of Schweinfurt, Germany

[73] Assignee: Fichtel & Sachs AG, Schweinfurt, Germany

[21] Appl. No.: 405,139

[22] Filed: Mar. 16, 1995

[30] Foreign Application Priority Data

Mar. 18, 1994 [DE] Germany .......................... 44 09 253.9

[51] Int. Cl.⁶ .................................................... F16D 13/68
[52] U.S. Cl. .................... 192/70.17; 192/107 R; 192/200
[58] Field of Search ............................ 192/70.17, 107 R, 192/200, 70.13

[56] References Cited

U.S. PATENT DOCUMENTS

| | | | |
|---|---|---|---|
| 4,588,062 | 5/1986 | Caray et al. | 192/70.17 X |
| 4,591,040 | 5/1986 | Schraut et al. | 192/70.17 X |
| 4,998,608 | 3/1991 | Raab et al. | |
| 5,004,088 | 4/1991 | Bolton | 192/70.17 X |

FOREIGN PATENT DOCUMENTS

| | | |
|---|---|---|
| 7148367 | 3/1972 | Germany . |
| 3922730 | 1/1991 | Germany . |
| 1526838 | 10/1978 | United Kingdom . |
| 2158194 | 11/1985 | United Kingdom . |

*Primary Examiner*—Andrea L. Pitts
*Attorney, Agent, or Firm*—Nils H. Ljungman and Associates

[57] ABSTRACT

A clutch plate with a torsional vibration damper has a hub for non-rotational mounting on a transmission shaft, a driving plate and a cover plate held at a fixed axial distance from the driving plate by means of a multiplicity of spacer bolts, whereby the driving plate is penetrated by a multiplicity of fastening elements, each of which is engaged at the base of the lining spring segments. For the purpose of connecting to the driving plate, there is a single fastening element and a rotational locking mechanism which interacts with it for each lining spring segment, whereby one of these two function elements acts as a spacer bolt.

16 Claims, 7 Drawing Sheets

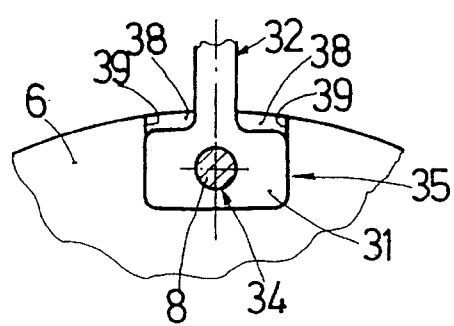
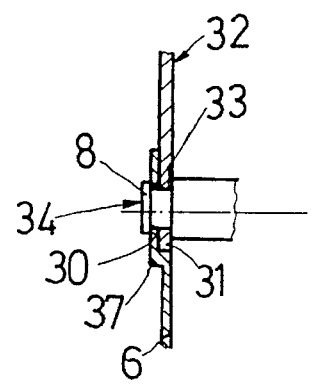
FIG. 2  FIG. 2a
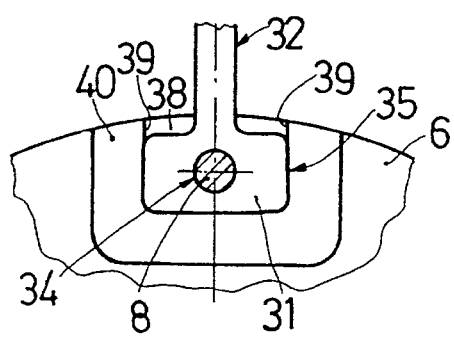
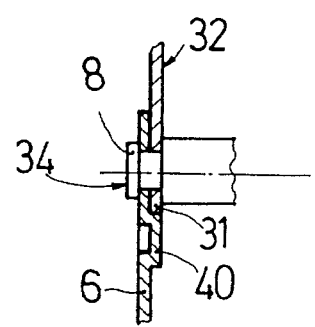
FIG. 3  FIG. 3a
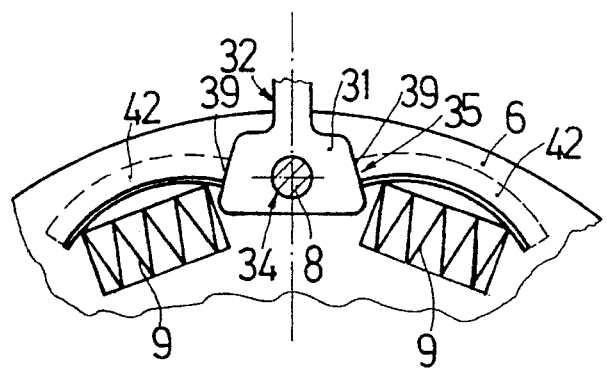
FIG. 4

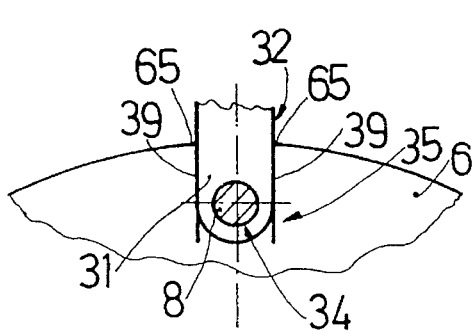
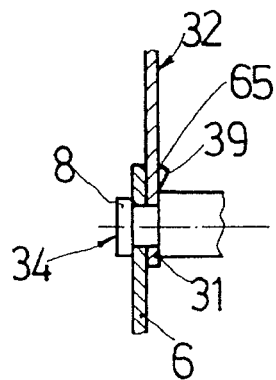
FIG. 5     FIG. 5a
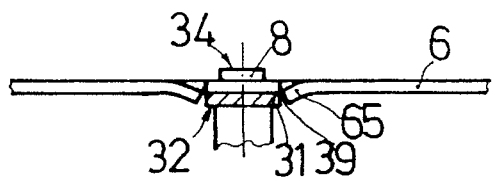
FIG. 5b
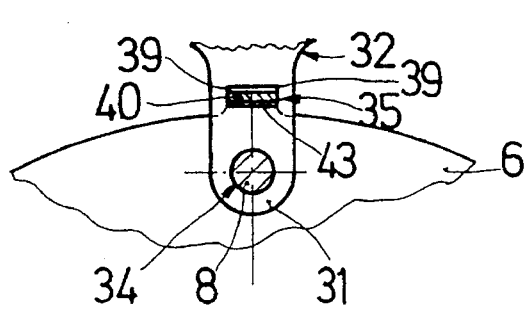
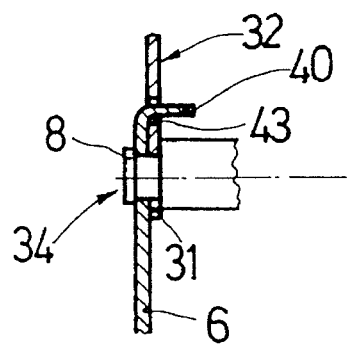
FIG. 6     FIG. 6a

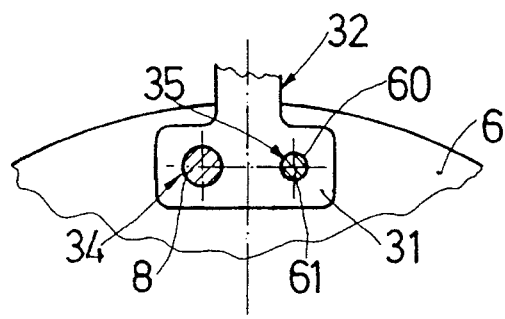 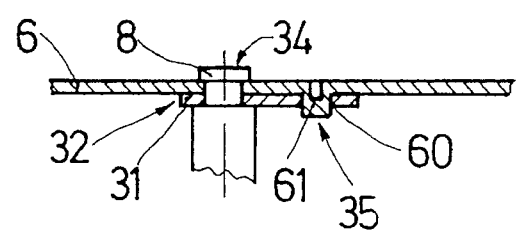
FIG. 7    FIG. 7a
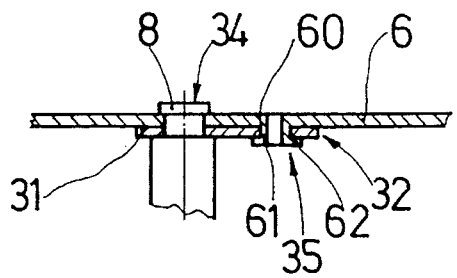
FIG. 8
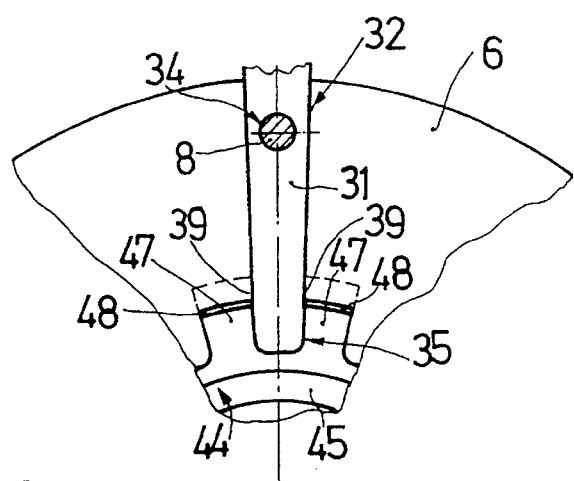 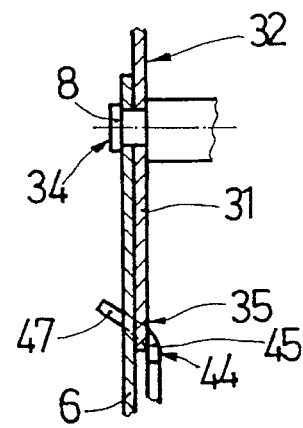
FIG. 9    FIG. 9a

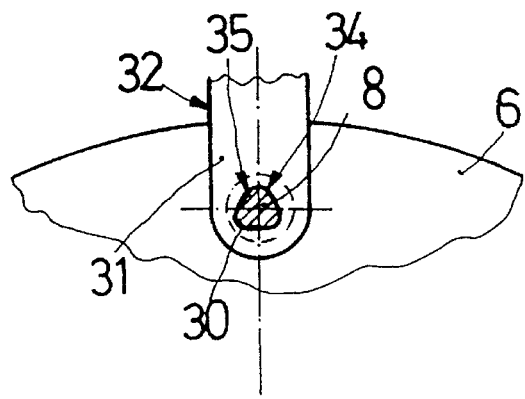
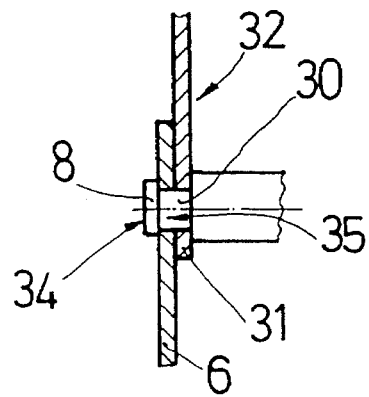
FIG. 13              FIG. 13a
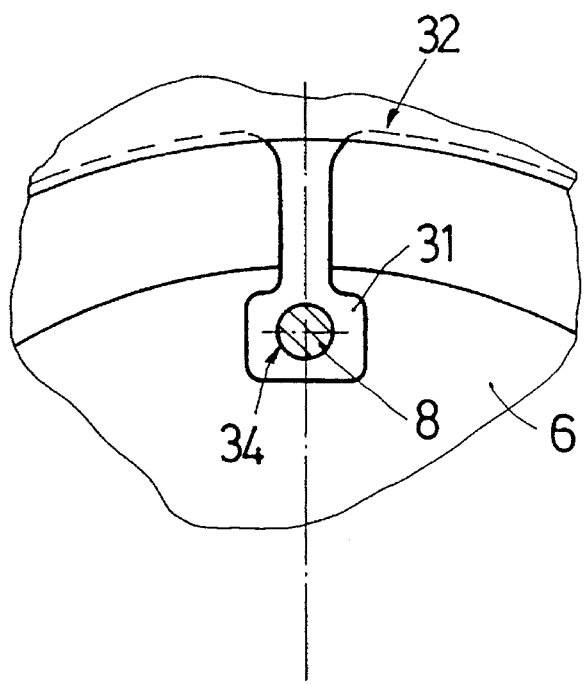
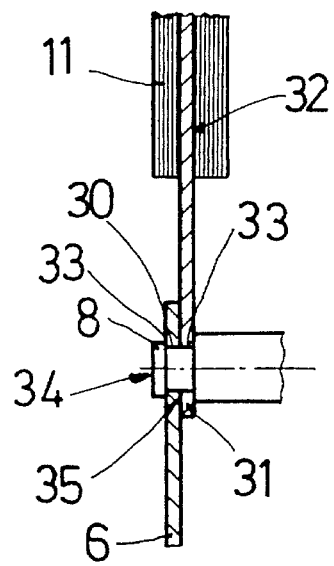
FIG. 14              FIG. 14a

MOTOR VEHICLE MANUAL TRANSMISSION WITH A CLUTCH WHICH CLUTCH HAS A FASTENING STRUCTURE FOR FASTENING THE LINING SPRING SEGMENTS TO THE DRIVING PLATE

BACKGROUND OF THE INVENTION

1. Field of the Invention

The present invention generally relates to a clutch plate with a torsional vibration damper for motor vehicle clutches. The torsional vibration damper typically has a hub by means of which it is non-rotationally mounted on a transmission shaft, a driving plate and at least one cover plate. The cover plate can be held at a fixed, specified axial distance from the driving plate by means of a multiplicity of spacer bolts, whereby the driving plate is penetrated by a number of fastening elements for a multiplicity of lining spring segments, each of which fastening element is engaged at the base of the lining spring segments.

2. Background Information

German Patent No. 39 22 730 Al, which has equivalent U.S. Pat. No. 4,998,608, has FIG. 1 and 2 which show such a clutch plate. On one side of a hub disc located on the hub, this clutch plate has a cover plate, and on the other side a driving plate, which is held at a fixed distance from the cover plate by means of a multiplicity of spacer bolts. Lining spring segments are fastened to the radially outermost region of the driving plate, whereby the base of each lining spring segment is fastened to the driving plate by means of a multiplicity of fastening elements in the form of rivets. The lining spring segments are located between two ring-shaped friction linings of the clutch plate.

Fastening the lining spring segments to the driving plate in this manner requires at least two fastening elements per lining spring segment to prevent rotation of the lining spring segments relative to the driving plate. As a result, the driving plate, which has the spacer bolts located along a radius which differs only slightly from the radius from the fastening elements of the lining spring segments to the axis of rotation of driving plate, is relatively heavy in the circumferential region, thus resulting in undesirable inertia.

German Utility Model 71 48 367 discloses specially designed spacer bolts which hold two cover plates at a specified distance from one another. The spacer bolts for each cover plate have a corresponding radially constricted region which, in addition to the cover plate, supports a driving plate which has friction linings in its circumferential region. The driving plate is held in contact with the cover plate by means of two limit stops formed on both sides of the radially constricted area of the spacer bolts.

OBJECT OF THE INVENTION

The object of the invention is to realize a clutch plate which reduces as much as possible the inertia of the driving plate and the effort and expense required to fasten the lining spring segments to it.

SUMMARY OF THE INVENTION

The present invention teaches that this object can be achieved by connecting the driving plate with a single fastening element and a rotational locking mechanism which interacts with the fastening element for each lining spring segment, and that one of these two function elements, i.e., the fastening element or the rotational locking mechanism, acts as a spacer bolt.

By using only a single fastening element to fasten the lining spring segments, a weight savings can preferably be achieved An the circumferential region of the driving plate, in particular if this fastening element simultaneously acts to hold the cover plate a specified distance from the driving plate. While the fastening element can thus be used to axially fix the driving plate relative to the dover plate and simultaneously to fasten a lining spring segment to the driving plate, the rotational locking mechanism can prevent a change in position of the lining spring segment relative to the clutch plate when torque is applied to the friction linings connected to the lining spring segments. However, in a variation of this very advantageous solution, it is likewise possible to use the single fastening element, with the addition of a rotational locking mechanism, to simply connect a fastening element to the driving plate while essentially using a spacer bolt to hold the cover plate a specified distance from the driving plate.

By generating an appropriate compressive force between a lining spring segment and the driving plate, the protection against rotation can preferably be achieved by means of friction. However, greater security can be achieved if the protection against rotation is preferably realized in the form of a positive interlock between a lining spring segment and the driving plate. To achieve this, one of the two connecting elements (lining spring segment, driving plate) can preferably be equipped with a projection which can be engaged in a recess in the other connecting element, or the driving plate can be equipped with pockets, for example, each of which acts to non-rotationally locate one lining spring segment. Another feature of the present invention contemplates various configurations of such devices to prevent rotation.

Another configuration of the present invention provides that the rotational locking mechanism can preferably be realized by means of an additional connecting element in particular if the fastening element also acts as a spacer bolt. Such connecting elements can preferably be realized in the form of a rivet, but there are other possibilities. In a further embodiment of the invention, there is preferably an opening in the driving plate, in the vicinity of which opening the driving plate is pushed on that side facing away from the fastening element by a mandrel, for example, in such a manner that material from the driving plate can preferably be pressed into the opening of the lining spring segment, thus essetially forming a positive interlock. In an additional embodiment of the invention, a particular degree of safety can be achieved if this indented material can be scoured against shifting by means of a radial expansion of the material.

In an additional embodiment of the invention, a particularly simple configuration of the rotational locking mechanism is preferably provided whereby rotation of the lining spring segment relative to the clutch plate can be prevented by means of the non-circular cross-section of the fastening element and the correspondingly shaped opening in the lining spring segment for the fastening element.

In a further embodiment of the invention, a particularly advantageous configuration of the fastening elements preferably provides the refinement of the fastening elements thereby ensuring that the lining spring segment is essentially held axially in contact with the driving disk with a minimum of design complexity. A further simplification of the design is achieved in another embodiment of the invention providing that the fasteners can be realized so that they not only can prevent axial movement of the lining spring segments but can also prevent the lining spring segments from rotating relative to the driving plate.

Another particular embodiment of the invention preferably provides the use of spacer bolts as the fastening element. In yet another embodiment of the invention, another element can perform the function of the fastening element. The fastening element can preferably be, for example, realized in the form of a rivet.

It should be understood that when the word "invention" is used in this application, the word "invention" includes "inventions", that is the plural of "invention". By stating "invention", applicant does not in any way admit that the present application does not include more than one patentably and non-obviously distinct invention, and maintains the possibility that this application may include more than one patentably and non-obviously distinct invention. The Applicant hereby asserts that the disclosure of this application may include more than one invention, and, in the event that there is more than one invention, that these inventions may be patentable and non-obvious, with respect to one another.

One aspect of the invention resides broadly in a friction clutch for a transmission for a motor vehicle, said friction clutch comprising: a housing and a clutch plate disposed within the housing, the clutch plate defining an axis of rotation and an axial direction parallel to the axis of rotation; a pressure plate apparatus disposed at least partly within the housing and movable in the axial direction, the pressure plate apparatus being configured for applying an axial force to the clutch disc along the axial direction; device for moving the pressure plate apparatus axially to apply and release the clutch disc; the clutch plate comprising: a hub comprising a device for engaging the shaft means of a transmission; a hub disc disposed concentrically about the hub and extending radially away from the hub and the hub disc having a first side and a second side; a drive plate disposed adjacent the first side of the hub; a cover plate disposed adjacent the second side of the hub; at least one friction lining structure comprising a plurality of segments for connecting the friction lining structure to the drive plate; each segment extending away from at least one friction lining structure; each segment having a base being disposed at an end portion of its corresponding segment; a drive plate having a first, inner, periphery and a second, outer, periphery; the first periphery of the drive plate being disposed toward the hub; and the second periphery of the drive plate being disposed away from the hub; the segments being disposed about the second periphery of the drive plate; the bases of the segments being disposed about the second periphery of the drive plate; a plurality of fastening elements; each segment having a single one of such fastening elements; each single fastening element fastening its corresponding segment to the drive plate; each single fastening element being disposed at the base of its corresponding segment and connecting the base of its corresponding segment to the drive plate; and an apparatus for preventing said segments from rotating with respect to said drive plate.

BRIEF DESCRIPTION OF THE DRAWINGS

The invention is described in greater detail below with reference to the embodiments illustrated in the accompanying drawings, in which:

FIG. 2 shows a partial view and section through the driving plate in the region where the base of the lining spring segment is fastened;

FIG. 2a shows the same components as in FIG. 2, but in a partially sectional view;

FIG. 3 shows the same view as in FIG. 2, whereby the base is prevented from rotating by means of a projection on the driving plate;

FIG. 3a shows the same components as in FIG. 3, but in a partially sectional view;

FIG. 4 shows the same view as in FIG. 2, but includes a setback to prevent rotation of the base of the lining spring segment, the setback being in the vicinity of the apertures for the force accumulators to prevent rotation;

FIG. 5 shows the same view as in FIG. 2, but with a bent portion of the driving plate on both sides of the base of a lining spring segment;

FIG. 5a shows another view of the bent portions as shown in FIG. 5;

FIG. 5b shows the same components as in FIG. 5, but in a partially sectional view;

FIG. 6 shows the same view as in FIG. 2, but with an axial bending of a radial projection of the driving plate in the longitudinal extension of the base of a lining spring segment;

FIG. 6a shows the same components as in FIG. 6, but in a partially sectional view;

FIG. 7 shows the same view as in FIG. 2, but with a rotational locking mechanism in the form of an indentation of the driving plate, the rotational locking mechanism extending into an opening in the base of a lining spring segment;

FIG. 7a shows a partially sectional view of FIG. 7;

FIG. 8 shows the same components as in FIG. 7, but with a radial expansion of the indentation;

FIG. 9 shows the same view as in FIG. 2, but with a spring acting in the axial direction, which spring pushes radial shoulders as a rotational looking mechanism on the base of a lining spring segment;

FIG. 9a shows a sectional view of FIG. 9;

FIG. 13 shows the same view as in FIG. 2, but with a specially shaped fastening element to prevent rotation;

FIG. 13a shows a partially sectional view of FIG. 13;

FIG. 14 shows the rotation realized by means of friction between the base of a lining spring segment and the driving plate; and FIG. 14a shows a partially sectional view of FIG. 14.

DESCRIPTION OF THE PREFERRED EMBODIMENT

Figure 1:
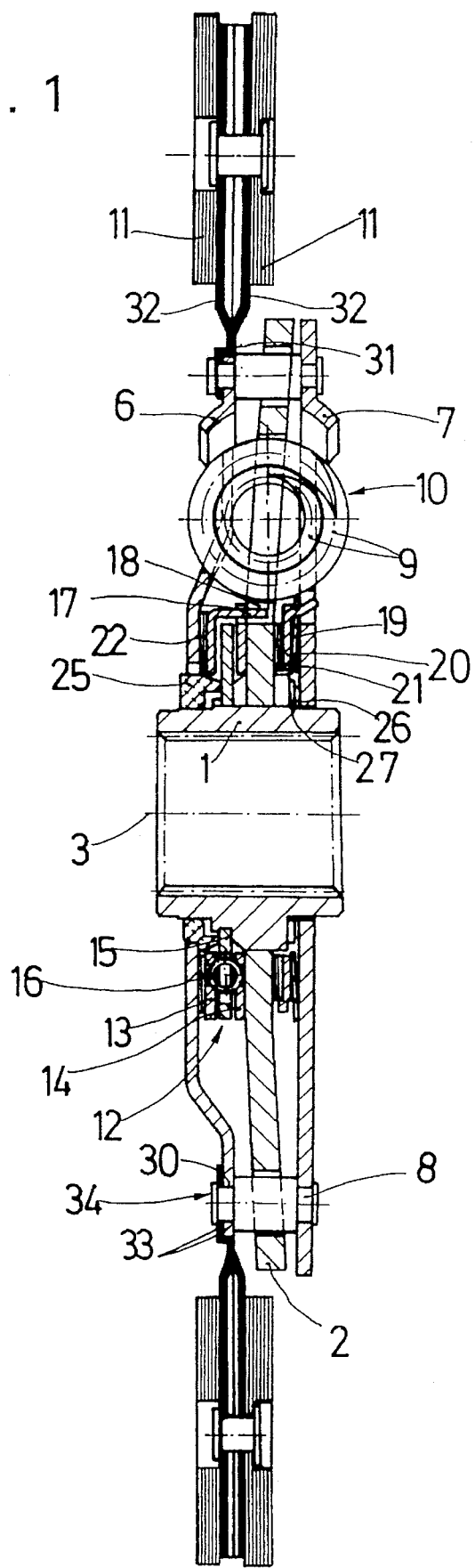
FIG. 1 shows a longitudinal section through a clutch plate with a driving plate and lining spring segments, the bases of which lining spring segments are inserted in pockets formed by means of axial offsets on the driving plate.

FIG. 1 shows a torsional vibration damper which can be non-rotationally mounted—but which can still be displaced axially—by means of the hub 1 to a transmission shaft (not shown) and which can preferably rotate around the axis of rotation 3. The torsional vibration damper is preferably connected circumferentially to a hub disk 2, by means of external gearing with rotational clearance or play. A driving plate 6 is preferably located on the left side of the hub disk 2 while a cover plate 7 is preferably located on the right side of the hub disk 2. The driving plate 6 and the cover plate 7 can be non-rotationally connected together and preferably held at a specified distance from one another by means of spacer bolts 8 around their outside diameters. The spacer bolts 8 preferably have a radially constricted region 30 for locating both the driving plate 6 and a base 31 of a lining spring segment 32. This constricted region 30 extends to such a degree in the axial direction that the driving plate 6 and the base 31 can come in contact with one another. Limit stops 33 on both sides of the radially constricted region 30 of the spacer bolts 8 essentially ensure that the base 31 of the lining spring segment 32 remains in contact with the driving plate 6. The number of lining spring segments 32 matches the number of spacer bolts 8, so that each lining spring segment 32 corresponds to at least one spacer bolt 8. Because the spacer bolt 8 alone can therefore connect the lining spring segment 32 and the driving plate 6, the spacer bolt 8 can act as the fastening element 34 for the lining spring segment 32. Each such fastening element 34 corresponds to a rotational locking mechanism 35 (FIGS. 2 through 14) for the respective lining spring segment 32. The actual design of such a rotational locking mechanism 35 is discussed in greater detail below. The individual lining spring segments 32 can preferably be connected to one another on both sides thereof by means of a ring-shaped friction lining 11.

Figure 1A:
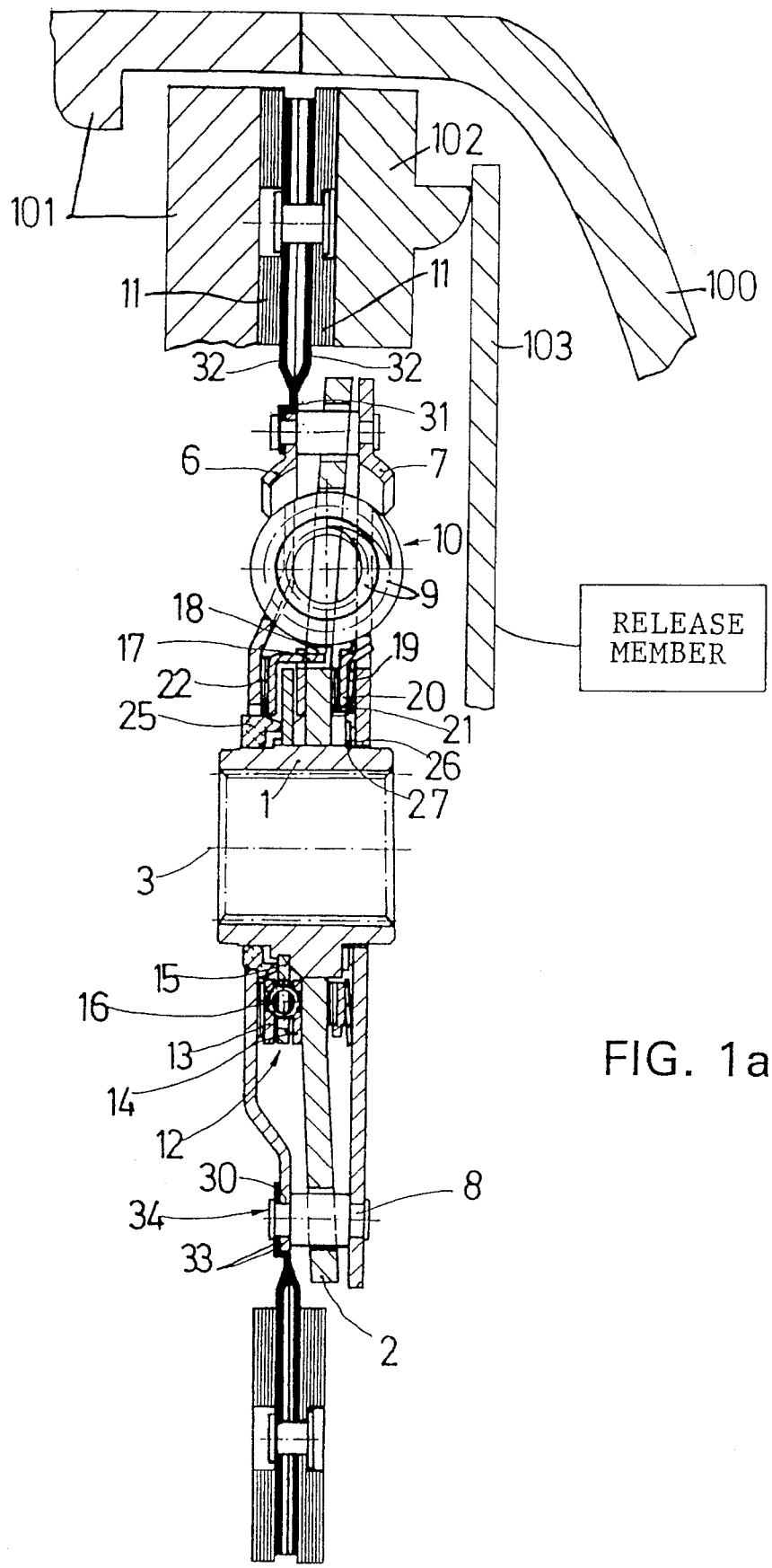
FIG. 1a shows the same view as in FIG. 1, but with additional components.

FIG. 1a shows a torsional vibration damper of the present invention in combination with a friction clutch. The friction clutch can include a housing 100, which housing 100 essentially encloses one side of the clutch plate, and which housing 100 can be used to attach the clutch to a flywheel 101, which flywheel 101 can preferably be rotationally attached to a crankshaft (not shown) of a motor vehicle. There can also be a pressure plate 102 for applying a pressure to the linings 11 to engage the linings 11 with the flywheel 101. A biasing member 103 can also be provided for applying the force to the pressure plate 102. In addition, a release member, shown only schematically, can also be provided to release the biasing member 103 from the pressure plate 102 to disengage the friction linings 11 from the flywheel 101. In essence, components such as the housing 100, flywheel 101, pressure plate 102, biasing member 103, and release member are well known, and are therefore not discussed in any more detail herein.

In the present invention, a single element can axially fix the driving plate and the cover plate and can act simultaneously to fasten the lining spring segment to the driving plate. The corresponding rotational locking mechanism 35 can preferably prevent the lining spring segment 32 from changing position relative to the clutch plate upon the application of torque to the friction linings 11 of the lining spring segments 32.

Force accumulators 9 in the form of lead spring devices 10 are preferably located in apertures in the driving plate 6 and the cover plate 7, as well as in the hub disk 2. Located between the hub disk 2 and the driving plate 6 is preferably a no-load spring assembly 12, having two cover plates 13 and 14 and a secondary flange 15 which ie non-rotationally mounted to the hub 1, as well as force accumulators 16. The outermost cover plate 13 has axially bent tabs 17 along its outside circumference, which tabs 17 extend into notches 18 of the hub disk 2 where they essentially form a rotational connection with no circumferential clearance or play. The same tabs 17 can also fix the circumference of the inside cover plate 14. When viewed axially, the cover plate 13 preferably rests on the cover plate 14 on supporting edges (not shown), and both are preferably braced axially against the hub disk 2. The axial bracing force can be generated by a spring plate or Belleville spring washer 19 preferably located between the cover plate 7 and an angular ring 20 which can be non-rotationally connected to the cover plate 7—but can be axially displaced—and essentially pushes a friction ring 21 which itself is preferably braced against the hub disk 2. The axial force of the spring plate 19 can be transmitted by means of the cover plate 7 and the spacer bolts 8 to the driving plate 6 and from there via a friction ring 22 to the outside cover plate 13 of the no-load spring assembly 12. This system is thus essentially self-contained in the axial direction.

Radial control of the rotating function elements can be made possible by means of a bearing element 25 inserted in the driving plate 6. This bearing element 25 can be pushed by a spring 26, one side of which is preferably braced via a spacer ring 27 against the hub 1 while the other side is preferably braced against the cover plate 7. The hub 1, the spring 26, the bearing element 25 and the spacer ring 27 thus essentially form a friction element with a low coefficient of friction, which friction element can be effective over the entire angular range of rotation and can produce the only frictional force in the no-load range. In the load range, this frictional force can be supplemented by another force which can be generated by the two friction rings 21 and 22 as well as the spring plate 19.

The configuration of the connecting point of the base 31 of the lining spring segment 32 to the driving disk 6 will be discussed in greater detail below with reference to FIGS. 2 through 14a. Beginning with FIGS. 2 and 2a, the driving plate 6 preferably has a shoulder or axial offset 37 at the point of engagement with the base 31 of the lining spring segment 32. This shoulder 37 can preferably be axially offset from the remainder of the driving plate 6 by the width of the lining spring segment 32 and can act as a pocket 38 for locating the base 31 of the lining spring segment 32. The lining spring segment 32 is preferably connected to the driving disk 6 by means of a spacer bolt 8 which can act as a fastening element 34, whereby the lateral limit stops 33 of the radially constricted region 30 of the spacer bolt 8 can hold the base 31 of the lining spring segment 32 firmly against the driving plate 6. As seen from the plan view in FIG. 2 of the driving plate 6, in particular, the base 31 of the lining spring segment 32 preferably lies flush in the circumferential direction against the side walls of the pocket 38 which can act as stops 39. The pocket 38 can thus act as a rotational locking mechanism 35 for the lining spring segment 32.

In the embodiment shown in FIGS. 2 and 2a, the walls of the pocket 38 abut the walls of the corresponding base 31 thereby forming stops 39 of the rotational locking mechanism 35. The stops 39 can thus prevent their corresponding lining spring segment 32 from rotating with respect to the drive plate, i.e. prevent rotation about spacer bolts 8.

In FIG. 3 and 3a, the pocket 38 for the circumferentially flush seating of the base 31 of the lining spring segment 32 can be formed by means of projections 40 which can be realized as material displaced from the beck side of the driving plate 6, for example. The projections 40 on both sides, or alternatively completely surrounding, the base 31 can serve as stops 39 and thus as a rotational locking mechanism 35.

In the embodiment shown in FIGS. 3 and 3a, the walls of the pocket 38 abut the walls of the corresponding base 31 thereby forming stops 39 of the rotational loöking mechanism 35. The stops 39 can thus prevent their corresponding lining spring segment 32 from rotating with respect to the drive plate.

As shown in FIG. 4, on the apertures of the driving plate 6 used to locate the force accumulators 9, there are setbacks 42 which, in addition to their primary function, i.e. guiding the force accumulators 9, can also preferably perform the additional function of a locking mechanism 35 for the lining spring segment 32. The so-called "setbacks" 42 can essentially be formed by axially bent flanges of the drive plate 6. The setbacks 42 preferably lie flush against both sides of the base 31 and can thus act as the stop 39. Here, as is also the case in FIGS. 2 and 3, the lining spring segment 32 can be held in contact with the driving plate 6 by means of a spacer bolt 8.

The force accumulators 9, shown in FIG. 4, can preferably be in the form of coil springs which are essentially located within apertures or windows. Each coil spring is preferably guided within its aperture or window by a setback 42 which can preferably be in the form of a curved projection formed from material bent outwardly to provide the apertures. These projections can preferably extend at approximately a 45° angle with respect to drive plate 6. As shown in FIG. 4, the base 31 of the lining spring segment 32 is preferably located between two such curved projections or setbacks 42. The inner ends of the curved projections or setbacks 42 preferably abut the sides of the base 31. The inner ends of the curved projections of setbacks 42 thereby essentially form the stops 39 for preventing rotation of the lining spring segment 32 with respect to the driving plate 6.

It should herein be noted that essentially only one stop 39 on the sides of base 31 can be sufficient in some instances to prevent rotation of the spring segments 32. This can essentially apply to any of the embodiments previously discussed, or which will be discussed further below.

FIGS. 5, 5a, and 5b show an additional embodiment in which to realize the rotational locking mechanism 35 for the lining spring segment 32, the driving plate 6 can preferably have slots in the edge region adjoining both sides of the base 31. These slots can make it possible to bend a radially extended portion 65 of the driving plate 6 in the axial direction in each of those regions adjacent to the base 31. Thus, the bent portions 65 with their side walls facing the base 31 can act as stops 39, between which the base 31 can be seated without clearance.

FIGS. 6 and 6a show a driving plate 6 having a projection 41 extending into the longitudinal extension of the base 31 of the lining spring segment 32. Such a projection 41 can preferably be bent in the axial direction and can pass through a notch 43 in the base 31 in such a manner that projection 41 can rest flush in the circumferential direction against the side walls of the notch 43, which can serve as stops 39. A rotational locking mechanism 35 can thus be formed.

FIGS. 7 and 7a show, that to realize a rotational locking mechanism 35 for the lining spring segment 32, an indentation 61 of the driving plate 6 can also be made in the direction of the base 31. This indentation 61 can be made on that side of the driving plate 6 opposite the base 31 of the lining spring segment 32 at a point corresponding to the point on the base 31 where an opening 60 is preferably formed. As such, the indentation 61 can preferably extend into the opening 60 to form a positive interlock. For such an embodiment as depicted in FIGS. 7 and 7a shifting of the driving plate 6 relative to the base 31 can essentially be effectively prevented if, as shown in FIG. 8, there can be a widened portion 62 on the free end of the indentation 61.

As shown in FIGS. 7 and 7a, in addition to a first aperture through which spacer bolt 8 can be disposed, a second aperture in the form of opening 60 can preferably be located in the base 31 adjacent fastening element 34. Opening 60 can be configured to receive indentation 61 therein which indentation 61 can preferably be located at a corresponding point in driving plate 6. The indentation 61 of driving plate 6 can extend through and preferably protrude from the opening 60 of base 31. As shown in FIG. 8, the free end of the indentation 61 can preferably be deformed into a widened portion 62 thereby preventing the corresponding lining spring segment 32 from rotating with respect to the driving plate 6.

FIGS. 9 and 9a show a driving plate 6 with a lining spring segment 32. For this embodiment, a retaining element 44 preferably in the form of a spring 45, acts against the lining spring segment 32. This retaining element 44 preferably acts in the axial direction, and can be, for example, a spring plate.

The spring 45, as shown in FIGS. 9 and 9a, preferably has radially extended shoulders 47, which shoulders 47 are preferably disposed adjacent the longitudinal extension of the base 31 of a lining spring segment 32. As such shoulders 47 can latch into corresponding notches 48 in the driving plate 6 under the pretension of the spring 45. When viewed circumferentially, the shoulders 47 essentially form the stops 39 of a rotational locking mechanism 35, between which stops 39, the base 31 of the lining spring segment 32 is preferably located without clearance.

As shown in FIGS. 9 and 9a, the retaining element 44 is preferably in the form of a spring plate 45. There are preferably shoulders 47 which radially extend from the outer periphery of spring plate 45 and are deformed axially. The shoulders 47 are preferably fit into notehas 48 located in driving plate 6. The pretension of the spring plate 45 essentially holds the shoulder 47 in place within notch 48 of the driving plate 6. The sides of shoulders 47 preferably abut the sides of base 31 thereby forming the stops 39 of the corresponding lining spring segment 32.

Figure 10:
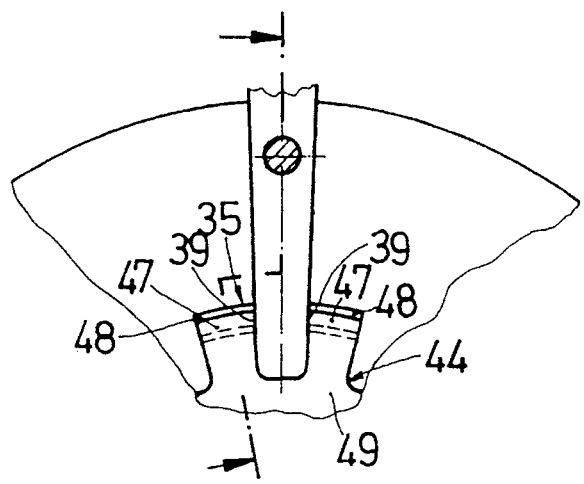
FIG. 10 shows the same view as in FIG. 2, but with an additional element which does not rotate relative to the driving plate as a rotational locking mechanism for a lining spring segment.
Figure 10A:
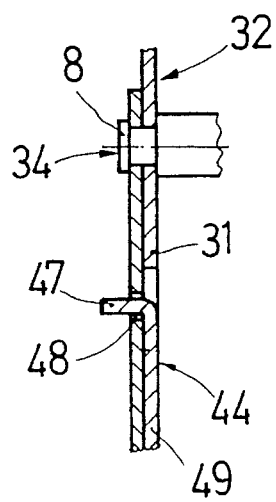
FIG. 10a shows a partially sectional view of FIG. 10.

In the embodiment shown in FIGS. 10 and 10a, the retaining element 44 can be realized in the form of a disk 49 having two radial shoulders 47 for each base 31 of a lining spring segment 32. The free ends of the shoulders 47 are preferably bent axially toward the driving plate 6 and can pass through notches 48 in the driving plate without clearance in the circumferential direction. The axial ends of the shoulders 47 can locate the base 31 of the lining spring segment 32 between them without clearance and can act as the stops 39 of a rotational locking mechanism 35.

Figure 11:
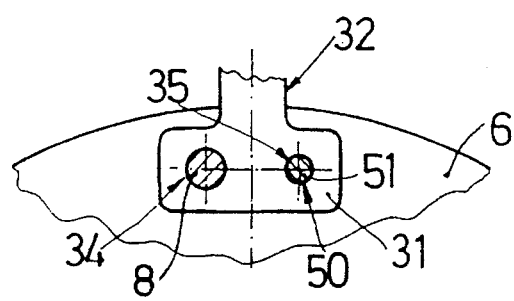
FIG. 11 shows the same view as in FIG. 2, but with a rivet to prevent rotation.
Figure 11A:
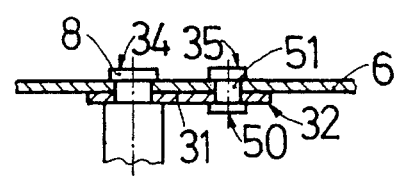
FIG. 11a shows a sectional view of FIG. 11.

The embodiment shown in FIG. 11 and 11a show, that to realize another embodiment of a rotational loöking mechanism 35, there can preferably be a second hole in the base 31 of the lining spring segment 32 into which an additional connecting element 50, in the form of a rivet 51 can be inserted. This embodiment is freely interchangeable with the embodiment shown in FIG. 12, in which the rivet 52 can act as a fastening element 34 and the spacer bolt 8 can act as the connecting element 50. The connecting element 50 can prevent the rotation of the lining spring segment 32 around the longitudinal axis of the respective fastening element 34.

Figure 12:
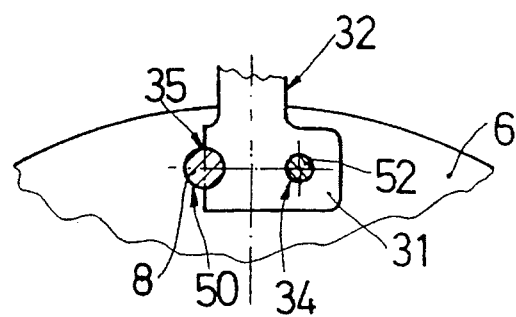
FIG. 12 shows the same view as in FIG. 2, but with a rivet as a fastening element and a spacer bolt to prevent rotation.

With the addition of a second hole in base 31, it is possible for either one of the fastening element 34 or the rotational locking mechanism 35 to act as spacer bolt 8. As shown in FIGS. 11 and 12, the embodiments and their components are substantially similar and can be interchangeable.

This additional connecting element 50 can be eliminated if, as shown in FIG. 13, the respective fastening element 34 preferably has a non-circular cross-section end is engaged in an opening of the base 31 of the lining spring segment 32 which is likewise non-circular. The cross-sectional shape of the fastening element 34 and the base 31 can prevent a rotation of the lining spring segment 32 around the axis of this fastening element 34. Many rectangular and also polygonal shapes are possible, whereby, as long as the fastening element 34 is essentially realized in the form of a spacer bolt 8, the configuration of the radially constricted region 30 with a non-circular cross-section can be sufficient. If a rivet 52 used as a fastening element 34, the rivet shank may preferably not be circular in shape.

FIGS. 14 and 14a show an embodiment in which the connection by means of a positive interlock between the lining spring segment 32 and the driving plate 6 has essentially been eliminated. To produce a non-positive interlock of sufficient strength between the two elements to replace the positive interlock, i.e. any of the previously discussed embodiments, the radially constricted region 30 of the spacer bolt 8 preferably extends to such a degree in the axial direction that the base 31 of the lining spring segment 32 can be pressed with great axial force against the driving plate 6 by the lateral limit stops 33 of the constricted region 30.

As shown in the embodiment in FIGS. 14 and 14a, a positive interlock, such as those described in the embodiments of FIG. 2 through 13a, between driving plate 6 and base 31 can essentially be replaced. The radially constricted region 30 of spacer bolt 8 can preferably be configured to have a specified axial width relative to the aperture located in driving plate 6 and base 31. As a result, there can be a substantial frictional engagement between the base 31 and the driving plate 6 when the spacer bolt 8 is fastened into place. In other words, the axial length of the constricted region 30 can be somewhat smaller than the combined thicknesses of the cover plate 6 and base 31. As such, a substantial compressive axial force will be needed to install the spacer bolt 8. Due to the substantial compressive axial force made possible by this configuration, there can be a substantially high frictional engagement between base 31 and driving plate 6, and the rotation of the lining spring segments 32 with respect to the driving plate 6 is substantially eliminated.

The components disclosed in the various publications, disclosed or incorporated by reference herein, may be used in the embodiments of the present invention, as well as, equivalents thereof.

One feature of the invention resides broadly in the clutch plate with torsional vibration damper for motor vehicle clutches, which torsional vibration damper has a hub by means of which it is non-rotationally mounted on a transmission shaft, a driving plate and at least one cover plate, which is held at a fixed, specified axial distance from the driving plate by means of a multiplicity of spacer bolts, whereby the driving plate is penetrated by a number of fastening elements for a multiplicity of lining spring segments, each of which element is engaged at the base of the lining spring segments, characterized by the fact that for the purpose of connecting to the driving plate 6, there is a single fastening element 34 and a rotational locking mechanism 35 which interacts with it for each lining spring segment 32, and that one of these two function elements fastening element 34, rotational locking mechanism 35 acts as a spacer bolt.

Another feature of the invention resides broadly in the clutch plate characterized by the fact that the lining spring segment 32 as a rotational locking mechanism 35 is connected by means of a positive interlock 39, 50, 61 to the driving plate 6.

Yet another feature of the invention resides broadly in the clutch plate characterized by the fact that the driving plate 6 is equipped in the vicinity of each fastening element 34 with a pocket 38 having stops 39 adjacent to both sides of the base 31 of the lining spring segment 32 as a rotational locking mechanism 35.

Still another feature of the invention resides broadly in the clutch plate characterized by the fact that the driving plate 6 has axial offsets shoulders 37 around its circumference, each of which acts as a pocket 38 into which the base 31 of a lining spring segment 32 can be inserted.

A further feature of the invention resides broadly in the clutch plate characterized by the fact that the driving plate 6 has projections 40 around its circumference, each of which acts as a stop 39 for the base 31 of a lining spring segment 32 in at least the corresponding circumferential direction.

Another feature of the invention resides broadly in the clutch plate with a torsional vibration damper having apertures into which energy accumulators can be inserted, whereby the driving plate is equipped with setbacks, notches, or knock-outs around the edges of the apertures, characterized by the fact that each setback 42 has one stop 39 which acts as a rotational locking mechanism 35.

Yet another feature of the invention resides broadly in the clutch plate characterized by the fact that each of the stops 39 is realized as a bend 65 of the driving plate 6 in those areas on both sides of the base 31 of the lining spring segment 32.

Still another feature of the invention resides broadly in the clutch plate characterized by the fact that each stop 39 is realized as an axial bend of the clutch plate 6 in the longitudinal vicinity of the base 31 of the lining spring segment 32, which stop penetrates without clearance in the circumferential direction through a recess 43 in the base 31.

A further feature of the invention resides broadly in the clutch plate characterized by the fact that the driving plate 6 has notches 48 on both sides of and adjacent to the base 31 of a lining spring segment 32, into each of which notches a shoulder 47 bent in the axial direction of a retaining element 44 is engaged without clearance in the circumferential direction, whereby a base 31 is non-rotationally located between every two shoulders 47.

Another feature of the invention resides broadly in the clutch plate as claimed in claim 9, characterized by the fact that the retaining element 44 is realized as a spring 45 resting against the driving plate 6 which acts in the axial direction and has two shoulders 47 for each lining spring segment 32, whereby the shoulders 47 latch in the respective notches 48 of the driving plate 6 by means of the pre-tension of the spring.

Yet another feature of the invention resides broadly in the clutch plate characterized by the fact that the retaining element 44 is realized as a disk 49 which penetrates through the notches 48 of the driving plate 6 by means of two shoulders 47 for each lining spring segment 32.

Still another feature of the invention resides broadly in the clutch plate characterized by the fact that the rotational locking mechanism 35 is realized in the form of a connecting means 50 which is engaged in the base 31 of the lining spring segment 32.

A further feature of the invention resides broadly in the clutch plate characterized by the fact that the connecting means 50 is realized in the form of the indentation 61 of a portion of a driving plate into an opening 60 of the base 31 of the lining spring segment 32, which opening is flush with said portion of the driving plate.

Another feature of the invention resides broadly in the clutch plate characterized by the fact that the indentation 61 can be secured against shifting by means of a bell 62 on that side of the base 31 facing away from the driving plate 6.

Yet another feature of the invention resides broadly in the clutch plate characterized by the fact that the fastening elements 34 have a non-circular cross-section and are engaged in an opening having the same cross-section in the base 31 of the lining spring segment 32.

Still another feature of the invention resides broadly in the clutch plate characterized by the fact that each of the fastening elements 34 is realized in the form of a spacer bolt 8, and there is one lining spring segment 32 corresponding to each of them.

A further feature of the invention resides broadly in the clutch plate with spacer bolts, which spacer bolts have a radially constricted region for seating the driving plate and an additional element, whereby the driving plate can be kept in contact with the additional element by means of the lateral limit stops of the constricted region, characterized by the fact that the additional element ie the lining spring segment 32 corresponding to each spacer bolt 8, which lining spring segment 32 is held in frictional contact with the driving plate by means of the lateral limit steps 33 of the constricted region 30.

Another feature of the invention resides broadly in the clutch plate characterized by the fact that the spacer bolts 8 have a non-circular cross-section at least in the constricted region 30.

Yet another feature of the invention resides broadly in the clutch plate characterized by the fact that the connector 50 is realized in the form of a rivet 52.

Still another feature of the invention resides broadly in the clutch plate characterized by the fact that the fastening elements 34 are each realized in the form of a rivet 52, each of which corresponds to one lining spring segment 32.

A further feature of the invention resides broadly in the clutch plate characterized by the fact that each spacer bolt 8 acts as a rotational locking mechanism 35 for one lining spring segment 32 in that the base 31 of the lining spring segment rests against the spacer bolt 8.

Some examples of clutch discs having control plates, which could have components which are interchangeable with the embodiments of the present invention, may be disclosed by the following U.S. Pat. Nos. 5,201,394 to Suzuki, entitled "Clutch Disk Assembly"; 4,577,742 to Saida, entitled "Clutch Disc"; 4,044,874 to Worner, entitled "Clutch Disc With Plural Friction Dampers"; and 3,982,617 to Worner, entitled "Clutch Disc for Main Clutches of Motor Vehicles".

Some examples of clutch discs having thrust rings, which could have components which are interchangeable with the embodiments of the present invention, may be disclosed by the following U.S. Pat. Nos. 4,863,005 to Parzefall, entitled "Friction Clutch"; 4,832,166 to Parzefall, entitled "Friction Clutch for Motor Vehicles"; and 4,669,594 to Weissenberger and Hayen, entitled "Clutch Disc for a Motor Vehicle Friction Disc Clutch".

Additional examples of clutch discs and friction linings, which could have components interchangeable with the embodiments of the present invention, may be disclosed by the following U.S. Pat. Nos. 5,000,304 to Koch et al., entitled "Clutch Disc"; 4,941,558 to Schraut, entitled "Clutch Disc"; 4,854,438 to Weissenberger and Huditz, entitled "Clutch Disc for a Friction Disc Clutch"; 4,741,423 to Hayen, entitled "Clutch Disc for a Friction Clutch"; and 4,715,485 to Rostin et al., entitled "Clutch Disc for a Motor Vehicle Friction Clutch".

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, are hereby incorporated by reference as if set forth in their entirety herein.

The corresponding foreign patent publication applications, namely, Federal Republic of Germany Patent Application No. P 44 09 253.9, filed on Mar. 18, 1994, having inventors Jens Schneider and Harald Jeppe, and DE-OS P 44 09 253.9 and DE-PS P 44 09 253.9, in any of the documents cited are hereby incorporated by reference as if set forth in their entirety herein.

The invention as described hereinabove in the context of the preferred embodiments is not to be taken as limited to all of the provided details thereof, since modifications and variations thereof may be made without departing from the spirit and scope of the invention.

What is claimed is:

1. A friction clutch for a transmission for a motor vehicle, said friction clutch comprising:

a housing;

a clutch plate disposed within said housing, said clutch plate defining an axis of rotation and an axial direction parallel to said axis of rotation;

pressure plate means disposed at least partly within said housing and movable in the axial direction, said pressure plate means being configured for applying an axial force to said clutch disc along the axial direction;

means for moving said pressure plate means axially to apply and release said clutch disc;

said clutch plate having:
 a hub, said hub comprising means for engaging shaft means of a transmission;
 a hub disc disposed concentrically about said hub and extending radially away from said hub, said hub disc having a first side and a second side;
 a drive plate disposed adjacent said first side of said hub disc;
 a cover plate disposed adjacent said second side of said hub disc;

at least one friction lining structure;

said at least one friction lining structure comprising a plurality of segments for connecting said friction lining structure to said drive plate;

each said segment extending away from said at least one friction lining structure;

each said segment having a base;

each said base being disposed at an end portion of its corresponding segment;

said drive plate having a first, inner, periphery and a second, outer, periphery;

said first periphery of said drive plate being disposed toward said hub;

said second periphery of said drive plate being disposed away from said hub;

said segments being disposed about said second periphery of said drive plate;

said base of each said segment being disposed about said second periphery of said drive plate;

a plurality of fastening elements;

each segment having a corresponding single one of said fastening elements;

each single fastening element fastening its corresponding segment to said drive plate;

each said single fastening element being disposed at the base of its corresponding segment and connecting the base of its corresponding segment to said drive plate;

means for preventing said segments from rotating with respect to said drive plate;

said means for preventing said segments from rotating being disposed at said base of its corresponding segment;

each said single fastening element comprising a spacer bolt;

each said spacer bolt comprising means for spacing said drive plate within said clutch with respect to another element of said clutch;

each said segment having its corresponding own distinct means for preventing that segment from rotating;

each said means for preventing its corresponding segment from rotating holding its own distinct corresponding segment;

said means for preventing said segments from rotating being disposed substantially adjacent said spacer bolt; and said means for preventing said segments from rotating being disposed a substantial distance from said hub.

2. The friction clutch according to claim 1, wherein;

each said base of each said segment has a peripheral edge;

each said means for preventing said segments from rotating comprising:
  a recess;
  said recess being disposed in said drive plate; and
  said recess having walls abutting said peripheral edge of the base of its corresponding segment.

3. The friction clutch according to claim 1, wherein;

said means for preventing said segments from rotating comprising:
  tabs being disposed at said drive plate;
  said tabs comprising bent up portions of said drive plate;
  each said base of each said segment has a peripheral edge; and
  each said tab having at least one inner end portion abutting said peripheral edge of the base of its corresponding segment.

4. The friction clutch according to claim 1, wherein;

said means for preventing said segments from rotating comprises:
  bent portions;
  said bent portions comprising a longitudinal axis;
  said bent portions extending from said drive plate in the axial direction;
  each said bent portion being disposed at the outer periphery of said drive plate;
  each said bent portion having an inner end and an outer end;
  each said base of each said segment has a peripheral edge; and
  each said inner end abutting said peripheral edge of the base of its corresponding segment.

5. The friction clutch according to claim 4, wherein:

each said bent portion comprises a longitudinal axis;

said bent portions comprising projecting means;

each said projecting means extending away from said drive plate in the axial direction;

each said projecting means being disposed at the outer periphery of said drive plate;

each said base comprising another aperture for receiving said projecting means;

said another base aperture having a longitudinal axis;

said longitudinal axis of said another base aperture being disposed substantially adjacent to the longitudinal axis of its corresponding single fastening element;

said longitudinal axis of said another base aperture being disposed substantially parallel to the longitudinal axis of its corresponding single fastening element;

each said projecting means being disposed in its corresponding another base aperture of its corresponding base;

each said projecting means having outer walls;

each said another aperture of each said base having inner walls; and each said outer wall of each said projecting means abutting its corresponding inner wall of its corresponding another base aperture.

6. The friction clutch according to claim 5, wherein;

said another element of said clutch comprises:
  said cover plate;
  said cover plate having a first periphery disposed toward said hub;
  said cover plate having a second periphery being disposed away from said hub;
  each said means for spacing being disposed between said second periphery of said drive plate and said second periphery of said cover plate; and
  said means for spacing disposing said drive plate and said cover plate at a distance relative to one another.

7. The friction clutch according to claim 1, wherein;

said means for preventing said segments from rotating comprises:
  a plurality of indentations;
  said plurality of indentations being disposed on said drive plate;
  said drive plate having a first side and a second side;
  each said indentation being disposed through and protruding from said second side of said drive plate;
  each said segment base comprising a first aperture for receiving said single fastening element;
  each said segment base comprising a second aperture being disposed substantially adjacent its corresponding single fastening element;
  each said second base aperture having walls;
  each said indentation having wall portions;
  said indentation wall portions abutting said second base aperture walls of its corresponding base;
  each said indentation having a free end being disposed through and protruding from said second aperture of said base;

each said free end comprising a widened portion; and
each said widened portion abutting said base of its corresponding segment.

8. The friction clutch according to claim 1, wherein;
said means for preventing said segments from rotating comprises:
an additional plate;
said drive plate comprising a first side and a second side;
each said base of each said segment has a peripheral edge;
said additional plate being disposed adjacent said second side of said drive plate and adjacent said peripheral edge of said base of its corresponding segment;
said additional plate having an outer periphery;
said additional plate comprising tang means;
said tang means being disposed about said outer periphery and radially extending from said outer periphery;
said drive plate having aperture portions for receiving said tang means;
each said tang means having an outer end portion; and
said tang means outer end portions abutting said peripheral edge of said base of its corresponding segment.

9. The friction clutch according to claim 8, wherein;
said additional plate comprises:
a spring plate;
said spring plate comprising pre-tensioned spring means; and
said pre-tensioned spring means comprising means for holding said tang means within said aperture portions of said drive plate.

10. The friction clutch according to claim 1, wherein;
said means for preventing said segments from rotating comprises:
a rivet;
said base having a second aperture being disposed substantially adjacent said corresponding single fastening element;
said second aperture for receiving said rivet;
said rivet being disposed through said second aperture of said base;
said second aperture having walls;
said rivet having a head and a shank; and
said head and said shank abutting said second aperture walls.

11. The friction clutch according to claim 1, wherein;
said means for preventing said segments from rotating comprises:
said single fastening element;
said spacer bolt having a shank;
said base having a single aperture for receiving said single fastening element;
said shank being disposed in said single aperture;
said single aperture having a first side and a second side;
said single aperture having a surface disposed at least about said first side;
said shank having an outer end and a shank portion;
said shank portion comprising walls;
said outer end comprising a head extending substantially beyond the walls of said shank portion;
said shank outer end abutting said surface about said first side of said single aperture;
said shank outer end providing a frictional contact between at least said segment base and said drive plate; and
said frictional contact comprising said means for preventing rotation.

12. A friction clutch for a transmission for a motor vehicle, said friction clutch comprising:
a housing;
a clutch plate disposed within said housing said clutch plate defining an axis of rotation and an axial direction parallel to said axis of rotation;
pressure plate means disposed at least partly within said housing and movable in the axial direction, said pressure plate means being configured for applying an axial force to said clutch disc along the axial direction;
means for moving said pressure plate means axially to apply and release said clutch disc;
said clutch plate having:
a hub, said hub comprising means for engaging shaft means of a transmission;
a hub disc disposed concentrically about said hub and extending radially away from said hub, said hub disc having a first side and a second side;
a drive plate disposed adjacent said first side of said hub disc;
a cover plate disposed adjacent said second side of said hub disc;
at least one friction lining structure;
said at least one friction lining structure comprising a plurality of segments for connecting said friction lining structure to said drive plate;
each said segment extending away from said at least one friction lining structure;
each said segment having a base;
each said base being disposed at an end portion of its corresponding segment;
said drive plate having a first, inner, periphery and a second, outer, periphery;
said first periphery of said drive plate being disposed toward said hub;
said second periphery of said drive plate being disposed away from said hub;
said segments being disposed about said second periphery of said drive plate;
said base of each said segment being disposed about said second periphery of said drive plate;
a plurality of fastening elements;
each segment having a corresponding single one of said fastening elements;
each single fastening element fastening its corresponding segment to said drive plate;
each said single fastening element being disposed at the' base of its corresponding segment and connecting the base of its corresponding segment to said drive plate; and
means for preventing said segments from rotating with respect to said drive plate;
said means for preventing said segments from rotating being disposed at said base of its corresponding segment;
for each said single fastening element and its corresponding means for preventing said segments from rotating, one of:
a) each said single fastening element, and
b) its corresponding means for preventing said segments from rotating comprises:

a spacer bolt;

each said spacer bolt comprising means for spacing said drive plate within said clutch with respect to another element of said clutch;

said means for preventing said segments from rotating comprising:

said spacer bolt;

said spacer bolt comprises a shank;

each said shank having a non-circular cross section;

each said base comprising a single aperture;

said non-circular cross section of said shank corresponding to a non-circular cross section of said single aperture;

said shank being disposed in said aperture;

said aperture having walls; and said non-circular cross section of said shank abutting said non-circular cross section of said aperture walls.

13. A friction clutch for a transmission for a motor vehicle, said friction clutch comprising:

a housing;

a clutch plate disposed within said housing, said clutch plate defining an axis of rotation and an axial direction parallel to said axis of rotation;

pressure plate means disposed at least partly within said housing and movable in the axial direction, said pressure plate means being configured for applying an axial force to said clutch disc along the axial direction;

means for moving said pressure plate means axially to apply and release said clutch disc;

said clutch plate having:

a hub, said hub comprising means for engaging shaft means of a transmission;

a hub disc disposed concentrically about said hub and extending radially away from said hub, said hub disc having a first side and a second side;

a drive plate disposed adjacent said first side of said hub disc;

a cover plate disposed adjacent said second side of said hub disc;

at least one friction lining structure;

said at least one friction lining structure comprising a plurality of segments for connecting said friction lining structure to said drive plate;

each said segment extending away from said at least one friction lining structure;

each said segment having a base;

each said base being disposed at an end portion of its corresponding segment;

said drive plate having a first, inner, periphery and a second, outer, periphery;

said first periphery of said drive plate being disposed toward said hub;

said second periphery of said drive plate being disposed away from said hub;

said segments being disposed about said second periphery of said drive plate;

said base of each said segment being disposed about said second periphery Of said drive plate;

a plurality of fastening elements;

each segment having a corresponding single one of said fastening elements;

each single fastening element fastening its corresponding segment to said drive plate;

each said single fastening element being disposed at the base of its corresponding segment and connecting the base of its corresponding segment to said drive plate; and means for preventing said segments from rotating with respect to said drive plate;

said means for preventing said segments from rotating being disposed at said base of its corresponding segment;

said means for preventing said segments from rotating comprising:

a rivet;

said rivet comprising a shank;

each said shank having a non-circular cross section;

each said base comprising a single aperture;

said non-circular cross section of said shank corresponding to a non-circular cross section of said single aperture;

said shank being disposed in said aperture;

said aperture having walls; and said non-circular cross section of said shank abutting said non-circular cross section of said aperture walls.

14. A friction clutch for a transmission for a motor vehicle, said friction clutch comprising:

a housing;

a clutch plate disposed within said housing, said clutch plate defining an axis of rotation and an axial direction parallel to said axis of rotation;

pressure plate means disposed at least partly within said housing and movable in the axial direction, said pressure plate means being configured for applying an axial force to said clutch disc along the axial direction;

means for moving said pressure plate means axially to apply and release said clutch disc;

said clutch plate having:

a hub, said hub comprising means for engaging shaft means of a transmission;

a hub disc disposed concentrically about said hub and extending radially away from said hub, said hub disc having a first side and a second side;

a drive plate disposed adjacent said first side of said hub disc;

a cover plate disposed adjacent said second side of said hub disc;

at least one friction lining structure;

said at least one friction lining structure comprising a plurality of segments for connecting said friction lining structure to said drive plate;

each said segment extending away from said at least one friction lining structure;

each said segment having a base;

each said base being disposed at an end portion of its corresponding segment;

said drive plate having a first, inner, periphery and a second, outer, periphery;

said first periphery of said drive plate being disposed toward said hub;

said second periphery of said drive plate being disposed away from said hub;

said segments being disposed about said second periphery of said drive plate;

said base of each said segment being disposed about said second periphery of said drive plate;

a plurality of fastening elements;

each segment having a corresponding single one of said fastening elements;

each single fastening element fastening its corresponding segment to said drive plate;

each said single fastening element being disposed at the base of its corresponding segment and connecting the base of its corresponding segment to said drive plate;

means for preventing said segments from rotating with respect to said drive plate;

each said base of each said segment having a peripheral edge;

each said means for preventing said segments from rotating comprising:
 a recess;
 said recess being disposed in said drive plate; and
 said recess having walls abutting said peripheral edge of the base of its corresponding segment.

15. A friction clutch for a transmission for a motor vehicle, said friction clutch comprising:

a housing;

a clutch plate disposed within said housing, said clutch plate defining an axis of rotation and an axial direction parallel to said axis of rotation;

pressure plate means disposed at least partly within said housing and movable in the axial direction, said pressure plate means being configured for applying an axial force to said clutch disc along the axial direction;

means for moving said pressure plate means axially to apply and release said clutch disc;

said clutch plate having:
 a hub, said hub comprising means for engaging shaft means of a transmission;
 a hub disc disposed concentrically about said hub and extending radially away from said hub, said hub disc having a first side and a second side;
 a drive plate disposed adjacent said first side of said hub disc;
 a cover plate disposed adjacent said second side of said hub disc;

at least one friction lining structure;

said at least one friction lining structure comprising a plurality of segments for connecting said friction lining structure to said drive plate;

each said segment extending away from said at least one friction lining structure;

each said segment having a base;

each said base being disposed at an end portion of its corresponding segment;

said drive plate having a first, inner, periphery and a second, outer, periphery;

said first periphery of said drive plate being disposed toward said hub;

said second periphery of said drive plate being disposed away from said hub;

said segments being disposed about said second periphery of said drive plate;

said base of each said segment being disposed about said second periphery of said drive plate;

a plurality of fastening elements;

each segment having a corresponding single one of said fastening elements;

each single fastening element fastening its corresponding segment to said drive plate;

each said single fastening element being disposed at the base of its corresponding segment and connecting the base of its corresponding segment to said drive plate; and means for preventing said segments from rotating with respect to said drive plate;

said means for preventing said segments from rotating comprising:
 bent portions;
 said bent portions comprising a longitudinal axis;
 said bent portions extending from said drive plate in the axial direction;
 each said bent portion being disposed at the outer periphery of said drive plate;
 each said bent portion having an inner end and an outer end;
 each said base of each said segment has a peripheral edge; and
 each said inner end abutting said peripheral edge of the base of its corresponding segment.

16. A friction clutch for a transmission for a motor vehicle, said friction clutch comprising:

a housing;

a clutch plate disposed within said housing, said clutch plate defining an axis of rotation and an axial direction parallel to said axis of rotation;

pressure plate means disposed at least partly within said housing and movable in the axial direction, said pressure plate means being configured for applying an axial force to said clutch disc along the axial direction;

means for moving said pressure plate means axially to apply and release said clutch disc;

said clutch plate having:
 a hub said hub comprising means for engaging shaft means of a transmission;
 a hub disc disposed concentrically about said hub and extending radially away from said hub, said hub disc having a first side and a second side;
 a drive plate disposed adjacent said first side of said hub disc;
 a cover plate disposed adjacent said second side of said hub disc;

at least one friction lining structure;

said at least one friction lining structure comprising a plurality of segments for connecting said friction lining structure to said drive plate;

each said segment extending away from said at least one friction lining structure;

each said segment having a base;

each said base being disposed at an end portion of its corresponding segment;

said drive plate having a first, inner, periphery and a second, outer, periphery;

said first periphery of said drive plate being disposed toward said hub;

said second periphery of said drive plate being disposed away from said hub;

said segments being disposed about said second periphery of said drive plate;

said base of each said segment being disposed about said second periphery of said drive plate;

a plurality of fastening elements;

each segment having a corresponding single one of said fastening elements;

each single fastening element fastening its corresponding segment to said drive plate;

each said single fastening element being disposed at the base of its corresponding segment and connecting the base of its corresponding segment to said drive plate; and means for preventing said segments from rotating with respect to said drive plate;

said means for preventing said segments from rotating comprising:

an additional plate;

said drive plate comprising a first side and a second side;

each said base of each said segment having a peripheral edge;

each said tang means having an outer end portion;

said tang means outer end portions abutting said peripheral edge of said base of its corresponding segment;

said additional plate comprising:

a spring plate;

said spring plate comprising pre-tensioned spring means; and said pre-tensioned spring means comprising means for holding said tang means within said aperture portions of said drive plate.

* * * * *

UNITED STATES PATENT AND TRADEMARK OFFICE
CERTIFICATE OF CORRECTION

PATENT NO. : 5,582,280
DATED : December 10, 1996
INVENTOR(S) : Jens SCHNEIDER and Harald JEPPE It is certified that error appears in the above-indentified patent and that said Letters Patent is hereby corrected as shown below:

In column 1, line 23, after 'has', delete "FIG." and insert --FIGS.--.

In column 2, line 5, after 'achieved', delete "An" and insert --in--.

In column 2, line 9, after the second occurrence of 'the', delete "dover" and insert --cover--.

In column 2, line 49, after the second occurrence of 'be', delete "scoured" and insert --secured--.

In column 4, line 40, after 'rotational', delete "looking" and insert --locking--.

In column 5, line 65, after 'which', delete "ie" and insert --is--.

In column 6, line 65, after the first occurrence of 'the', delete "beck" and insert --back--.

In column 7, line 5, after 'rotational', delete "looking" and insert --locking--.

In column 8, line 38, after 'into', delete "notehas" and insert --notches--.

In column 11, line 29, after 'element', delete "ie" and insert --is--.

UNITED STATES PATENT AND TRADEMARK OFFICE
CERTIFICATE OF CORRECTION

PATENT NO. : 5,582,280

DATED : December 10, 1996

INVENTOR(S) : Jens SCHNEIDER and Harald JEPPE

It is certified that error appears in the above-indentified patent and that said Letters Patent is hereby corrected as shown below:

In column 11, line 32, after 'limit', delete "steps" and insert --stops--.

In column 12, lines 26-27, after 'DE-PS P 44 09 253.9,' delete "in any of the documents cited".

Signed and Sealed this

Twenty-second Day of April, 1997

Attest:

Attesting Officer

BRUCE LEHMAN

Commissioner of Patents and Trademarks